UNITED STATES PATENT OFFICE.

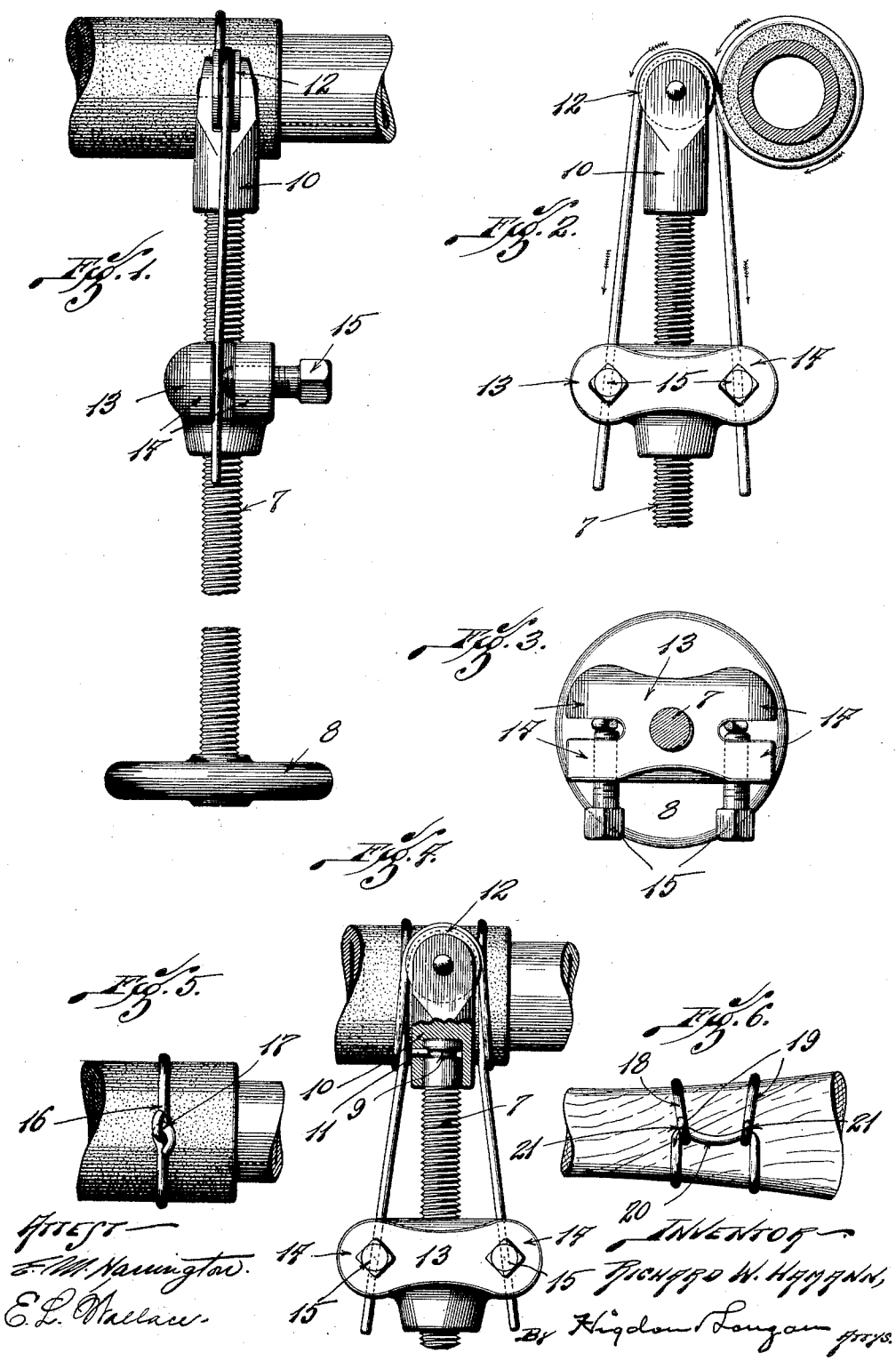

RICHARD W. HAMANN, OF ST. LOUIS, MISSOURI, ASSIGNOR TO EUGENE J. FEINER, OF ST. LOUIS, MISSOURI.

WIRE-CLAMPING TOOL.

1,071,154.　　　　　Specification of Letters Patent.　　Patented Aug. 26, 1913.

Application filed January 4, 1913.　Serial No. 740,122.

*To all whom it may concern:*

Be it known that I, RICHARD W. HAMANN, a citizen of the United States, and resident of St. Louis, Missouri, have invented certain new and useful Improvements in Wire-Clamping Tools, of which the following is a specification containing a full, clear, and exact description, reference being had to the accompanying drawings, forming a part hereof.

My invention relates to improvements in wire clamping tools, the object of my invention being to construct a tool for forming and applying bonds of either single or double strands and applying them to objects, such as hammer handles or sections of hose, and to arrange the tool in such manner as to apply double strand bonds to tapering objects, such as hammer handles with an equal tension on each strand.

With the above purposes in view my invention consists in certain novel features of construction and arrangement of parts as will be hereinafter more fully described, pointed out in the claim and illustrated by the accompanying drawings, in which—

Figure 1 is a plan view showing the tool as used in forming and applying the bond of a single strand, a portion of the threaded stem of the tool being broken away; Fig. 2 is an elevation of the tool as shown in Fig. 1, a portion of the threaded stem and the hand wheel being removed; Fig. 3 is an end view of the wire clamp, the threaded stem being shown in section; Fig. 4 is a plan of the tool in a position to form a bond of a double strand, the threaded stem and hand wheel being removed; Fig. 5 is a plan of a single bond strand as formed and applied by my tool; and Fig. 6 is a plan of a double strand as formed and applied by my tool on a tapering object.

Referring by numerals to the accompanying drawings: 7 designates a stem threaded throughout its length having secured to its outer end a hand wheel 8, and adjacent the opposite end of the stem there is formed an annular channel 9.

10 designates a head having a bore at its inner end to receive the end of the stem 7.

11 designates a pin which is secured in the head to project into the channel 9 in the stem in order to form a swivel connection between the stem and the head. The outer end of the head is bifurcated, and journaled in the bifurcation is a grooved roller 12.

13 designates a wire clamp through which there is formed an internally threaded bore which embraces the threaded stem. Each end of the clamp carries a pair of arms 14, and one of the arms of each pair is provided with an internally threaded bore to receive a set screw 15.

16 designates a single wire bond. As formed and applied by my improved tool, this bond is substantially circular and has at each of its ends an eye 17 which eyes, as clearly shown in Fig. 5, are interlocked.

18 designates a double strand bond which is made of a single piece of wire of substantially U-shape and, as formed and applied, comprises the two circular strands 19, the connecting bar or bight 20 and the eyes 21.

In applying the single bond, as shown in Fig. 1, the wire is shaped by hand, as shown in Figs. 1 and 2, completely encircling the object to be bonded or clamped and placed about the roller 12, both ends of the bond being secured in the clamp 13. The hand wheel is then turned in a direction to move the clamp away from the head, thereby drawing on both ends of the bond and hence tightening it about the object to be bonded. After there is the required tension on the bond about the object the ends of the bond are united by turning the entire tool so as to twist or partially wrap the ends of the wire about each other. The ends of the wire are then cut near the twist and the operator then forms the eyes 17 with an ordinary hammer or like tool. In some cases instead of forming the eyes the ends of the bond may be united by simply twisting the ends together.

In forming the double bond, as shown in Fig. 6, the wire is first formed into U-shape and doubled to form the two circular bonds with their ends beneath the bar or bight 20. This doubling is usually accomplished over the object to be clamped. The bar or bight 20 is then fitted into the groove in the roller 12 and the free ends of the bond are secured in the clamp 13. The hand wheel 8 is then turned, thereby moving the clamp away from the head. Thus it is obvious that, by reason of the roller 12, a like tension is formed on each leg of the bond and objects, such as hammer handles which taper, may be clamped by my improved tool. After there is the required tension made upon the bond the entire tool carrying the ends of the bond is upset over the bar or bight 20, thereby forming the eyes 21.

I claim:

In a wire clamping tool, a threaded stem, means for rotating the stem, a head having a swivel-connection with the stem, a grooved roller rotatably carried by the head, and a wire-holding device having a threaded connection with the stem, whereby the same tool may be employed to apply to objects a wire clamp of a single or double strand, and whereby a double strand clamp may be applied to a tapering object with equal tension on each strand.

In testimony whereof, I have signed my name to this specification, in presence of two subscribing witnesses.

RICHARD W. HAMANN.

Witnesses:
 E. L. WALLACE,
 N. G. BUTLER.

Copies of this patent may be obtained for five cents each, by addressing the "Commissioner of Patents, Washington, D. C."